No. 739,993. PATENTED SEPT. 29, 1903.
W. DECKER.
MOTOR VEHICLE.
APPLICATION FILED JAN. 21, 1903.
NO MODEL.
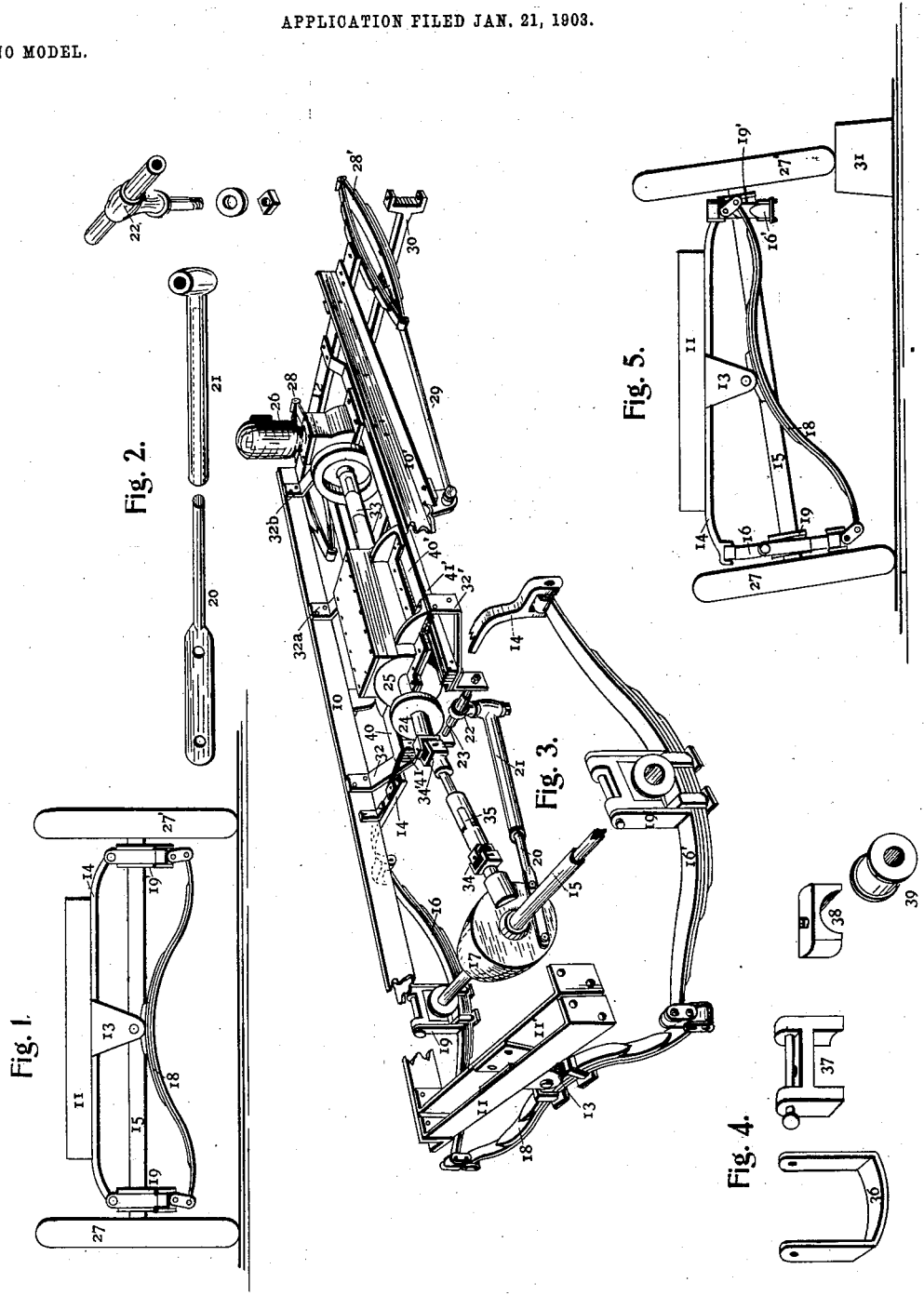
WITNESSES:
George H Webster
Charles H Barton
INVENTOR:
Ward Decker No. 739,993. Patented September 29, 1903.

UNITED STATES PATENT OFFICE.

WARD DECKER, OF OWEGO, NEW YORK.

MOTOR-VEHICLE.

SPECIFICATION forming part of Letters Patent No. 739,993, dated September 29, 1903.

Application filed January 21, 1903. Serial No. 140,029. (No model.)

*To all whom it may concern:*

Be it known that I, WARD DECKER, a citizen of the United States, residing at Owego, in the county of Tioga and State of New York, have invented a new and useful Motor-Vehicle, of which the following is a specification.

My invention relates to motor-vehicles; and it consists of a novel arrangement of the frame, running-gear, motive gear, bearings, and other details, all of which are fully specified, shown, and claimed in the following specification. These features are illustrated in the accompanying drawings, in which—

Figure 1 shows an outline rear elevation of the vehicle; Fig. 2, details of the radius-rod; Fig. 3, a perspective view of the springs, bearings, motive gear, &c., as applied to the frame; Fig. 4, details of the rear bearings; and Fig. 5 shows an outline rear elevation of the vehicle with one wheel raised, as in going over an obstruction.

I prefer to construct my motor-vehicle as shown in Fig. 3, where 10 and 10' are angle-iron or L-section sides connected by a bar 12 at the forward end and by the flat metal strips 11 and 11' at the rear end. The wood body of suitable construction is adapted to set on the flat portion of the angle-irons. The side pieces are further fastened together by the spring-supporting cross-bar 14 and by the drop-frame composed of the longitudinal metal strips 40 and 41 and 40' and 41', supported by the bent cross-plates 32, 32ª, and 32ᵇ. 32 is divided into two parts, a bracket fastened to the lower side of each and the brackets connected rigidly by a round rod.

The motive power shown is of the gasolene type; but other power can be used. In this case the motor 26 and transmission-gear of any suitable kind are connected together by an "Oldham" coupling 33 and the two are bolted to the longitudinal top plates 40 41. 24 is a brake-wheel. The rear axle is solid and surrounded by driving-sleeves connected to the wheels and a differential gearing in the usual manner, and this axle, with its sleeves, will be hereinafter considered as one designated by the number 15. A bevel-drive is used to obtain the necessary flexibility required by this system, and the bevel-gears, together with the differential, are inclosed in a case 17.

Power from the gear-box 25 is conveyed by a shaft provided with universal joints 34 34' directly to the bevel driving-gear. An extension-joint is provided in this shaft, (shown at 35.)

19 and 19' are self-alining bearings fastened by clips to the springs 16 16'. They are shown in detail in Fig. 4, where 39 is a cylindrical shell with flanges and contains any suitable bearing, either ball, roller, or plain. 38 is a block fitting between the flanges on 39 and has rounded ends made on a true circle with each other. This block may be fastened to 39 in any suitable way, although it is not necessary to fasten it.

37 is a piece formed in its lower inside part to a circular shape fitting the circle on the outside of 38. A circular raised portion on the top of 38 fits a round hole in 37, and when assembled 37 has a limited circular movement at right angles to the axle. A pin is shown through the two upper lugs on 37, and this supports the bent strap 36, as shown at 19 19', Fig. 3. By this arrangement not only is the bearing held in true alinement with the axle, but the side thrust of the vehicle exerted through the cross-bar 14 and rear spring 18 is brought very close to the plane in which the upper parts of bearings 19 19' lay, thereby obviating to a large extent twisting strains on the side springs and sustaining-bolts. The swinging looped piece 36, Fig. 4, is also essential to swing the spring attached thereto into its proper place when one wheel of the vehicle is raised, as hereinafter explained.

The rear springs used in my invention are of the so-called "platform" style, with their forward ends supported by the bar 14, Fig. 3, rigidly attached to the frame. The cross-spring, however, is not rigidly attached to the frame, as in the usual manner, but is pivotally supported at its center, as shown at 13; Figs. 1, 3, and 5. By this arrangement in connection with the self-alining bearings previously described any one of the four vehicle-wheels can rise in passing over even high obstructions independently of the other wheels without springing the body or bending a spring, it being assumed, of course, that a wheel is mounted on each end of each axle shown in Fig. 3. This action is clearly shown in the outline, Figs. 1 and 5. Fig. 1 shows the vehicle as standing on a level surface and Fig. 5 as passing over an obstacle 31. In Fig. 5 wheel 27' is elevated, carrying the axle with it. This elevates spring 16' and tips spring 18, as shown, the right end elevated, the left depressed. In depressing the left end of 18 the rear end of 16 is also lowered and the forward end raised, using the bearing 19 as a fulcrum. As spring 16' was raised directly by wheel 27' and as the forward end of 16 was raised by the agency of the pivoted cross-spring, it follows as the body is connected to the forward ends of both 16 and 16' by the cross-bar 14 that the said body will rise evenly both sides alike, the springs not having been bent, but only acting as equalizing-levers. Similarly the front wheels in passing over obstructions separately only tip the body on the rear pivot, the springs 16 16' again acting as equalizing-levers. In Fig. 5 is clearly shown the positions the rear springs assume and also the swing of the piece 36, Fig. 4, which was previously mentioned as being of importance.

As the rear axle is free to turn around in the bearings and as the gear-case 17, carried by the axle, is free to swing around the latter, a radius-rod must be provided to keep the case from turning, and as the axle has first one end elevated and then the other, has some backward and forward and some side movement—in fact, is a floating axle—some provision for all these movements must be made. This is accomplished by making the radius-rod in three pieces, 20, 21, and 22, Figs. 2 and 3. As shown in Fig. 3, 20 is bolted to the case with its round portion entering the tube-like part of 21. This latter part is provided with an eye at the end opposite the tube adapted to take the lower rounded pin part of 22, Fig. 2. The hole in the eye is vertical to the hole in the tube part. The piece 22 is also of a tube-like shape, and the pin part is vertical to that portion.

Referring to Fig. 3, the tube portion of 22 is shown mounted and free to slide on the rod 23. The pin part of 22 enters the eye on 21, and the arrangement permits motion of any kind to the gear-case 17, circular movement around the axle excepted.

The forward springs 28 28' are mounted on the extended ends of the bar 12 and the front axle 30 held from moving otherwise than vertically by rods joined to the main frame, as shown by 29. This extended bar 12 permits of getting the springs close to the wheels and makes a convenient support for lamp-brackets, fender-irons, &c.

What I claim as my invention, and desire to secure by Letters Patent, is—

1. In a motor-vehicle a main frame, side springs bolted at their forward ends to the main frame, a cross-spring connecting the rear ends of the side springs and pivotally connected at its center to the main frame, a self-alining bearing carried by each side spring, and a shaft carried by the bearings.

2. In a motor-vehicle a main frame, platform-springs connected thereto, a rocking joint for holding the cross member of the platform-spring, self-alining bearings carried by the side members, an axle connecting the bearings and free to turn therein, a gear-box carried by the axle, and a radius-rod connecting the gear-box with the main frame.

3. In a motor-vehicle a main frame, pivoted platform-springs connected thereto and carrying a pair of self-alining bearings, an axle connecting the bearings and free to turn therein, a gear-case carried by the axle, and a telescopic radius-rod connecting the gear-case with the main frame, said radius-rod being free to move on a pin attached to a slide adapted to move transversely to the main frame.

4. In a motor-vehicle a main frame, pivoted platform-springs attached thereto, self-alining bearings carried by the springs, an axle carried by the bearings and free to turn therein, a gear-case carried by the axle, a radius-rod connecting the gear-case and the main frame so arranged as to allow motion to the gear-case in any direction except circularly around the axle, gearing contained in the gear-case, a source of power on the main frame, and a universally-jointed extensible shaft connecting said power source with the gearing.

5. In a motor-vehicle a main frame, a sub-frame, pivoted platform-springs carried by the main frame, self-alining bearings carried by the springs, an axle carried by, and free to turn in, the bearings, driving-wheels attached to the axle, and a gear-case mounted on the axle, a radius-rod connecting the gear-case with the main frame so arranged as to permit movement of the gear-case in various directions but not circularly around the axle, gearing connecting with the axle and contained in the gear-box, a motor on the subframe, and an extensible universally-jointed shaft connecting the gearing with the motor.

6. In a motor-vehicle a main frame, side springs bolted at their forward ends to the main frame but free to move on the said bolts, a cross-spring connecting the free ends of the side springs, said cross-spring fastened at its center to a rocking joint connected to the main frame, self-alining bearings carried by the side springs, an axle carried by the bearings, drive-wheels carried by the axle, a bevel-gear connected to said axle, a case inclosing the gear and carried by said axle, a radius-rod connecting the gear-case with the main frame, a motor on the main frame, a universally-jointed extensible shaft connected with the motor at one end and terminating in a bevel-pinion at the other end said bevel-pinion meshing with the bevel-gear.

7. In a motor-vehicle a main frame, a sub-frame carried by the main frame, side springs loosely bolted at their forward ends to the main frame, a cross-spring attached to the main frame by a rocking joint, and connecting the free ends of the side springs, self-alining bearings carried by the side springs, a double shaft carried by the bearings, a suitable differential gearing connecting the shaft parts, a motor carried by the subframe, suitable speed-changing gears carried by the subframe and connected to the motor, a universally-jointed extensible shaft connected with the speed-gears, suitable bevel-gearing connecting the latter shaft with the differential gears, a case surrounding such bevel-gears, a radius-rod connecting the case with the subframe, said radius-rod preventing circular motion of the case around its axis but permitting movement in other directions.

8. In a motor-vehicle front springs attached to an axle and suitably secured to a main frame, suitable wheels carried by the axle, rear side springs connected at their forward ends to the main frame, a cross-spring pivotably connected at its middle to the main frame and connecting the free ends of the side springs, self-alining bearings carried by the side springs, an axle carried by the bearings, wheels mounted on said axle all so arranged that any single wheel can rise independently of the others without bending the frame or springs.

9. In a motor-vehicle a frame composed of metal side plates of L-section, a flat bar placed crosswise in front and fastened to the lower flat portions of the L-pieces, and projecting beyond them for a spring-support, a pair of flat plates placed edgewise to the L-pieces and fastened to the vertical flat portions of the latter, and a support for a rear spring fastened to the edgewise-disposed plates, in combination with a spring-supporting cross-bar, and a subframe adapted to carry motive power and gearing.

10. In a motor-vehicle a self-alining bearing composed of a cylindrical bearing-shell, a block fitted to or forming part of the said shell and provided with a rounded portion at right angles to the axial length of the shell, a second block partly encircling the first block at its rounded portion and slightly movable around it, a metal strap suspended by a pin near the top of the second block and having a free swinging motion thereon, said strap forming a loop hanging underneath the bearing-shell, means for suspending the vehicle from the lowest portion of the strap, in combination with an axle adapted to turn in the cylindrical bearing-shell.

WARD DECKER.

Witnesses:
JESSE BRINK,
PHEBE A. DECKER.